United States Patent
Nakano

[11] Patent Number: 6,133,934
[45] Date of Patent: Oct. 17, 2000

[54] IMAGE FORMING APPARATUS HAVING AN IMAGE CONVERSION TABLE FOR CORRECTING A PROPERTY OF THE APPARATUS

[75] Inventor: Masao Nakano, Kamakura, Japan

[73] Assignee: Canon Kabushiki Kaisha, Tokyo, Japan

[21] Appl. No.: 08/527,383

[22] Filed: Sep. 13, 1995

Related U.S. Application Data

[63] Continuation of application No. 07/957,919, Oct. 8, 1992, abandoned.

[30] Foreign Application Priority Data

| Oct. 8, 1991 | [JP] | Japan | 3-289207 |
| Oct. 22, 1991 | [JP] | Japan | 3-302350 |

[51] Int. Cl.$^7$ .............. G01D 9/42; H04N 1/00; B41J 2/435
[52] U.S. Cl. .......... 347/246; 347/247; 347/253; 358/406; 358/296
[58] Field of Search .............. 346/108, 153.1, 346/154, 157; 355/208; 358/448, 461, 296, 406; 347/246, 129, 133, 225, 247, 253

[56] References Cited

U.S. PATENT DOCUMENTS

| 4,710,785 | 12/1987 | Mills | 346/153.1 |
| 4,751,377 | 6/1988 | Ishizaka et al. | 250/205 |
| 4,761,659 | 8/1988 | Negishi | 346/108 |
| 4,779,106 | 10/1988 | Mills | 346/154 |
| 4,814,791 | 3/1989 | Oharu et al. | 346/108 |
| 5,155,529 | 10/1992 | Rushing | 355/208 |
| 5,202,773 | 4/1993 | Kato | 358/461 |
| 5,214,518 | 5/1993 | Kato | 358/448 |
| 5,258,783 | 11/1993 | Sasanuma et al. | 346/157 |
| 5,504,517 | 4/1996 | Takashi et al. | 347/246 |

FOREIGN PATENT DOCUMENTS

| 264886 | 4/1988 | European Pat. Off. | H04N 1/40 |
| 269033 | 6/1988 | European Pat. Off. | G03G 15/052 |
| 420573 | 4/1991 | European Pat. Off. | H04N 1/036 |

OTHER PUBLICATIONS

Japanese Patent Abstracts, vol. 7, No. 214 (E–199), Kokai 58–106953 (Jun. 1983).
Official Journal, EPO, pp. 214–226, Decision of Technical Board of Appeal 3.5.1 dated Mar. 31, 1994, T1055/92—3.5.1 (Official Text).

*Primary Examiner*—Randy W. Gibson
*Attorney, Agent, or Firm*—Fitzpatrick, Cella, Harper & Scinto

[57] ABSTRACT

An image forming apparatus includes reading means for converting image light obtained by optically scanning an original into an electric signal. An image signal conversion table converts the image signal from the reading means in response to a property of the image forming system. An image signal generating device generates a reference image signal, and an image forming device forms an image on a recording sheet in response to the image signal. The image is formed on the recording sheet by the image forming device in response to the image signal generated by the image signal generating device, and image light obtained by optically scanning the recording sheet is converted into an image signal by the reading device, and the image signal conversion table is corrected on the basis of the image signal converted by the reading device.

1 Claim, 15 Drawing Sheets

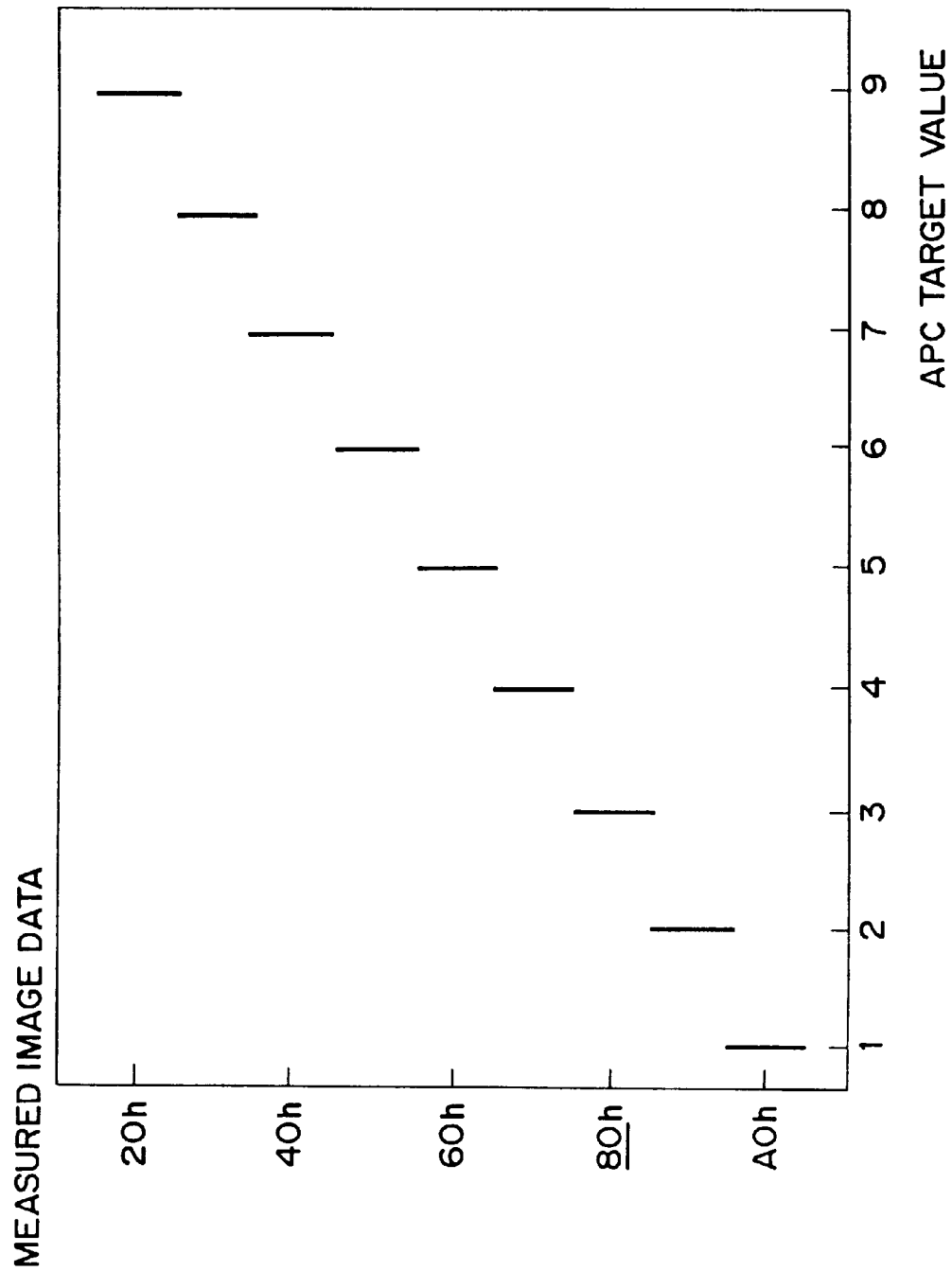

IMAGE FORMING APPARATUS HAVING AN IMAGE CONVERSION TABLE FOR CORRECTING A PROPERTY OF THE APPARATUS

This application is a continuation of application Ser. No. 07/957,919 filed Oct. 8, 1992, now abandoned.

BACKGROUND OF THE INVENTION

1. Field of the Invention

The present invention relates to an image forming apparatus of a digital type, and more particularly, it relates to an image forming apparatus having a table for coordinating, or corresponding, an image signal from a reading means to a recording means.

2. Related Background Art

In some known image forming apparatus of a digital type, a conversion table is provided for coordinating an image signal from a reading means for reading an original to a recording means. However, due to the deterioration and/or contamination of parts in the apparatus and change in environmental conditions, such conversion table cannot perform the proper conversion, thus creating a problem that an output image differs from a desired one.

As an example, in some image forming apparatus of a digital type, an image signal conversion table (referred to as a "LUT" or "look-up table" hereinafter) is used for correcting the output property of the apparatus and for emphasizing a specific density area. In such image forming apparatus, generally, an image reading means, an image processing means, an image writing means and the like are provided, and the look-up table is incorporated into the image processing means and serves to convert an input image signal input from the image reading means to the image processing means into an output image signal which is in turn input to the image writing means.

A curve (a) shown in a graph of FIG. 2 indicates a relation between an output image signal S2 and an output image density D1 in an electrophotographic printer. Even when the input image signal sent from the image reading means (reader) reflects image density D0 (not shown) of the original correctly, if the data is output as it is, the output image density D1 will not be proportional to the output image signal S2, as apparent is from the output property shown by the curve (a) in FIG. 2, thus deviating from the original image density D0. In order to eliminate the difference between input image density and the output image density, it is known that the image signal must be converted by the look-up table.

A method for forming the look-up table for corresponding the input image density to the output image density will be explained with reference to FIG. 2, if it is assumed that the input image signal S1 (not shown) from the image reading means reflects the read density, by making the relation between the output image signal S2 and the output image density D1 linear (as shown by a straight line (b) in FIG. 2), it is possible to coincide the input image density with the output image density (incidentally, there is density which cannot be reproduced, in view of the property of the printer). If the maximum reproduceable density of the printer is 1.5 and the output image signal is in a range from 00h to FFh (hexadecimal numbers), as shown in FIG. 2, the output image density D1 corresponding to the output image signal S2 of 80h is desirable to have a value of 0.75 from the relation as shown by the straight line (b). However, actually, since the printer has the property as shown by the curve (a), the output image density D1 of 0.75 is attained by the output image signal S2 of 57h. Accordingly, one data in the look-up table must serve to convert the output image signal S2 of 80h into an output image signal of 57h. In this way, the look-up table serves to convert the output image signals from 00h to FFh into values for correcting the respective output properties. Incidentally, a point Q where the curve (a) and the straight line (b) are crossed in FIG. 2, since the density on the curve are the same as the density on the straight line, the output image signal (48h) in this case is not required to be converted.

However, since the look-up table is formed in consideration of the output property of the printer regarding the image density as mentioned above, if the output property of the printer is varied, for example, by the "deterioration and/or contamination" of an image forming means of the printer, the look-up table cannot perform the proper correction. Further, if the value to be corrected is too great (for example, when the actual output property greatly deviates from the ideal output property (straight line) it should be corrected to a value on the straight line), the look-up table has the tendency to emphasize the minor change in the output property greatly, and thus, the look-up table is not suitable in the practical use.

Further, also in an image forming apparatus having a light amount table for coordinating an image density signal from a reading means to a laser amount of a recording means, when parts of the apparatus are deteriorated or the environmental conditions are changed, the light amount table cannot operate correctly, thus creating a problem that a proper image cannot be reproduced.

SUMMARY OF THE INVENTION

An object of the present invention is to provide an image forming apparatus having an image signal conversion table, which can reproduce the proper image even if a property of the apparatus is varied.

Another object of the present invention is to provide an image forming apparatus having a light amount table, which can reproduce the proper image even if a property of the apparatus is varied.

A further object of the present invention is to provide an image forming apparatus wherein a conversion table can be corrected by forming an image on a recording sheet in response to a reference signal and by scanning and reading the image on the recording sheet.

A still further object of the present invention is to provide an image forming apparatus wherein a recording means can be corrected on the basis of a conversion table by forming an image on a recording sheet in response to a reference signal and by scanning and reading the image on the recording sheet.

The other objects of the present invention will be apparent from the following descriptions.

BRIEF DESCRIPTION OF THE DRAWINGS

FIG. 14 is a graph showing a light amount table used with another embodiment of the present invention;

DETAILED DESCRIPTION OF THE PREFERRED EMBODIMENT

The present invention will now be explained in connection with embodiments thereof with reference to the accompanying drawings.

Figure 1:
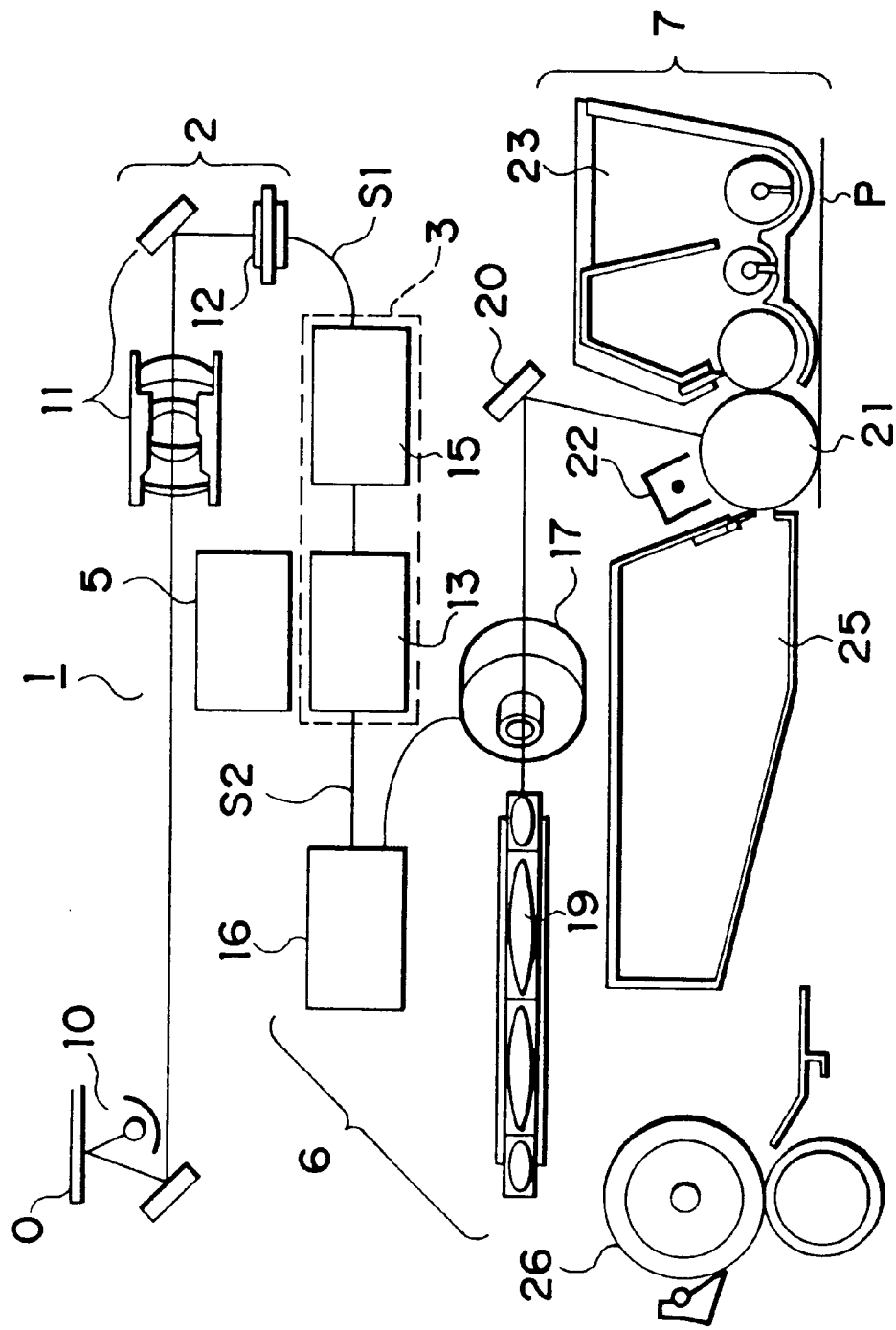
FIG. 1 is a schematic elevational sectional view of an image forming apparatus according to a preferred embodiment of the present invention.

In FIG. 1 schematically showing an image forming apparatus according to a preferred embodiment of the present invention, an image forming apparatus 1 comprises an image reading means 2, an image processing means 3, an image signal generating device 5, an image writing means 6, an image forming means 7 and the like.

The image reading means 2 is provided with a lighting device 10 for lighting and scanning an original placed on an original glass support 10 at a predetermined reading position thereof. Light emitted from the lighting device 10 is reflected by the original, and the reflected light is directed to a CCD (photoelectric conversion element) 12 acting as the reading means via an optical system 11 comprising mirrors and lenses. The CCD 12 cooperates with the optical system 11 to convert an original image into an input image signal S1 (electric signal) of eight-bits with an resolving power of 400 dpi.

The image processing means 3 has a look-up table (LUT) 13 which is an image signal conversion table through which the input image signal S1 from the CCD 12 is processed to be output as an output image signal S2. An auxiliary table 15 is connected to the LUT 13 to correct an image data of the LUT 13. The LUT 13 and the auxiliary table 15 will be fully described later.

Figure 7:
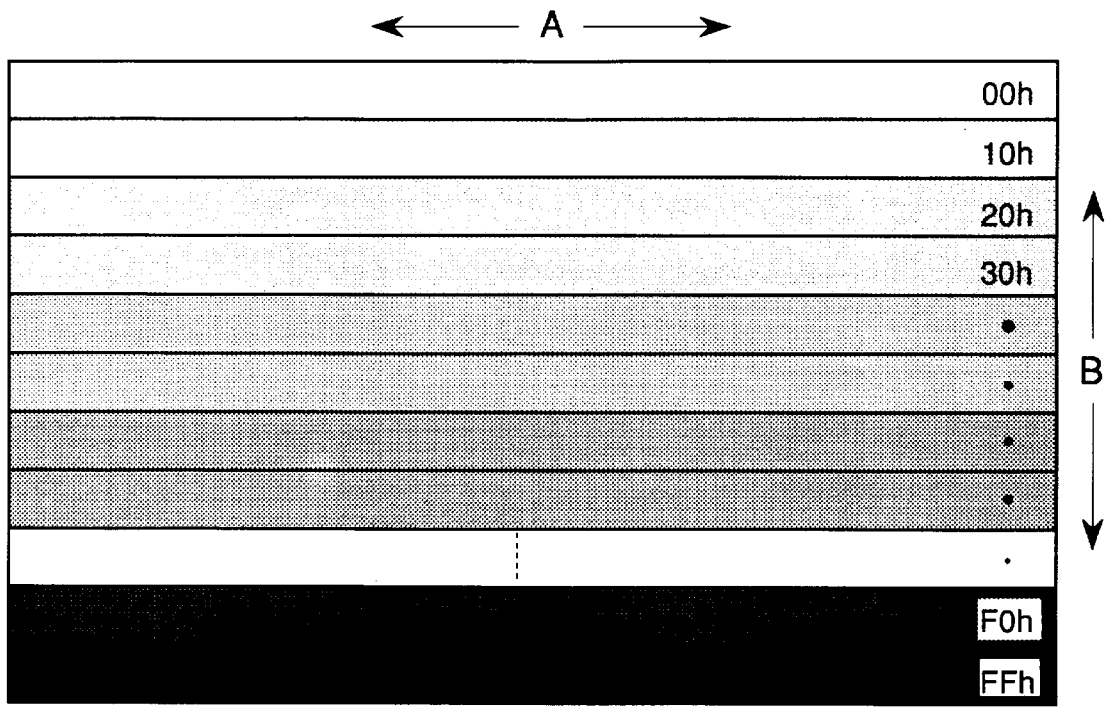
FIG. 7 is a view showing an image pattern output by a check pattern.

The image signal generating device 5 is connected to the image processing means 3 so that it can generate any reference image signal for the LUT 13 of the image processing means 3 at any pattern and also generate a predetermined check pattern. For example, from this check pattern, an image pattern as shown in FIG. 7 is formed through a predetermined image forming process including the image forming means 7 which will be described later. The image pattern is so formed that the density thereof from a white portion (00h) to a black portion (FFh) is gradually increased at seventeen steps per 10h (incidentally, the values 00h, FFh, 10h and the like are hexadecimal numbers, and the explanation of the intermediate steps will be omitted).

The image writing-in means 6 has a laser driver circuit 16 for driving a semi-conductor laser 17 on the basis of the output image signal S2 from the LUT 13. A laser beam emitted from the semi-conductor laser 17 is deflected by a rotating polygonal reflection mirror 19 and then is sent to a photosensitive drum (image bearing member) 21 via a mirror 20.

The image forming means 7 comprises a charger 22, a developing device 23 and a cleaner 25 which are arranged around the photosensitive drum 21 and is so designed that the photosensitive drum 21 is uniformly charged by the charger 22, an electrostatic latent image is formed on the photosensitive drum by illuminating the laser light thereon to perform the exposure, and the latent image is developed by the developing device 23 with developer (toner) as a toner image. The toner image is transferred onto a recording sheet P supplied from a sheet supply and feed device (not shown) to the photosensitive drum 21, and then is fixed to the recording sheet by a fixing device 26. Thereafter, the recording sheet is ejected from the image forming apparatus 1 as a finished output image (copy).

Figure 2:
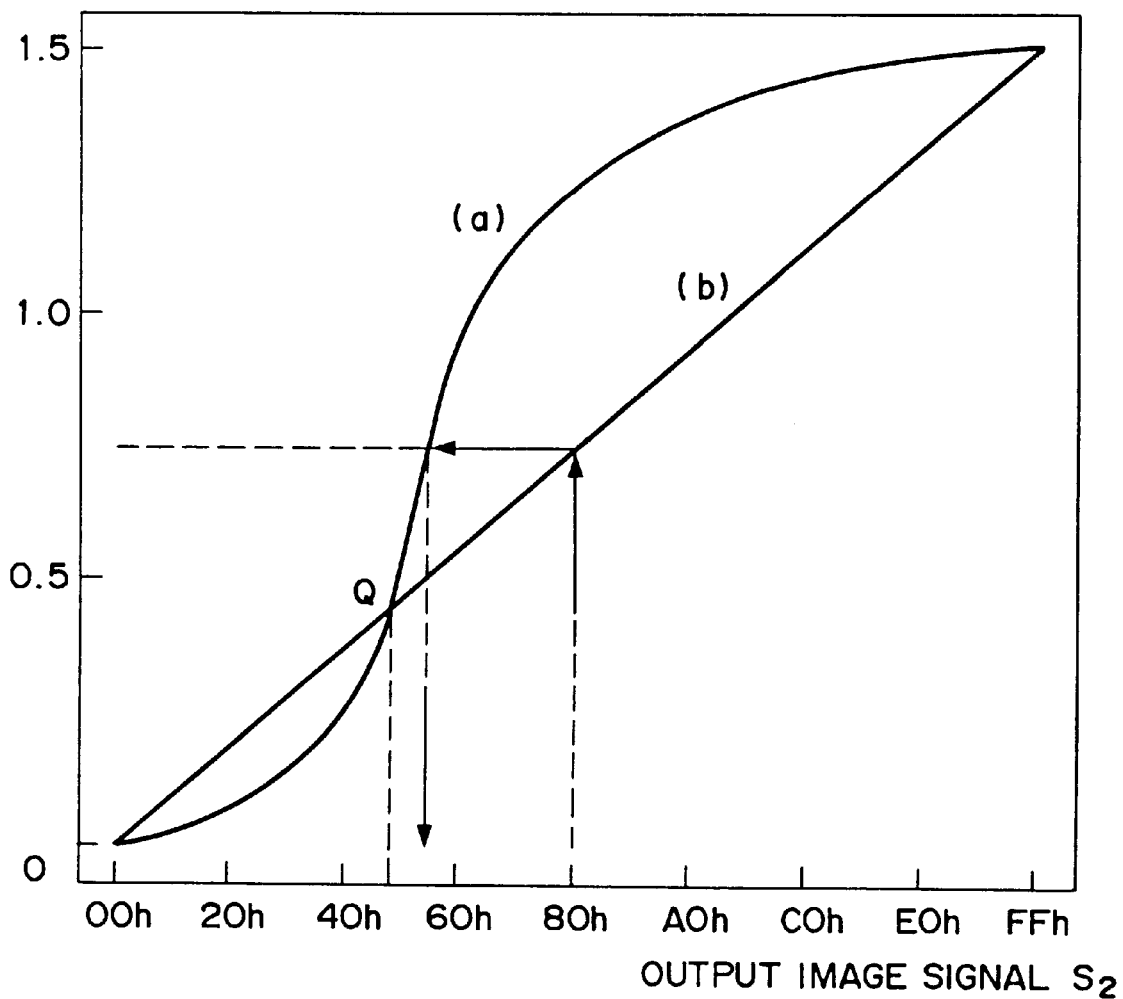
FIG. 2 is a graph showing a method of forming a look-up table (image signal conversion table)
Figure 3:
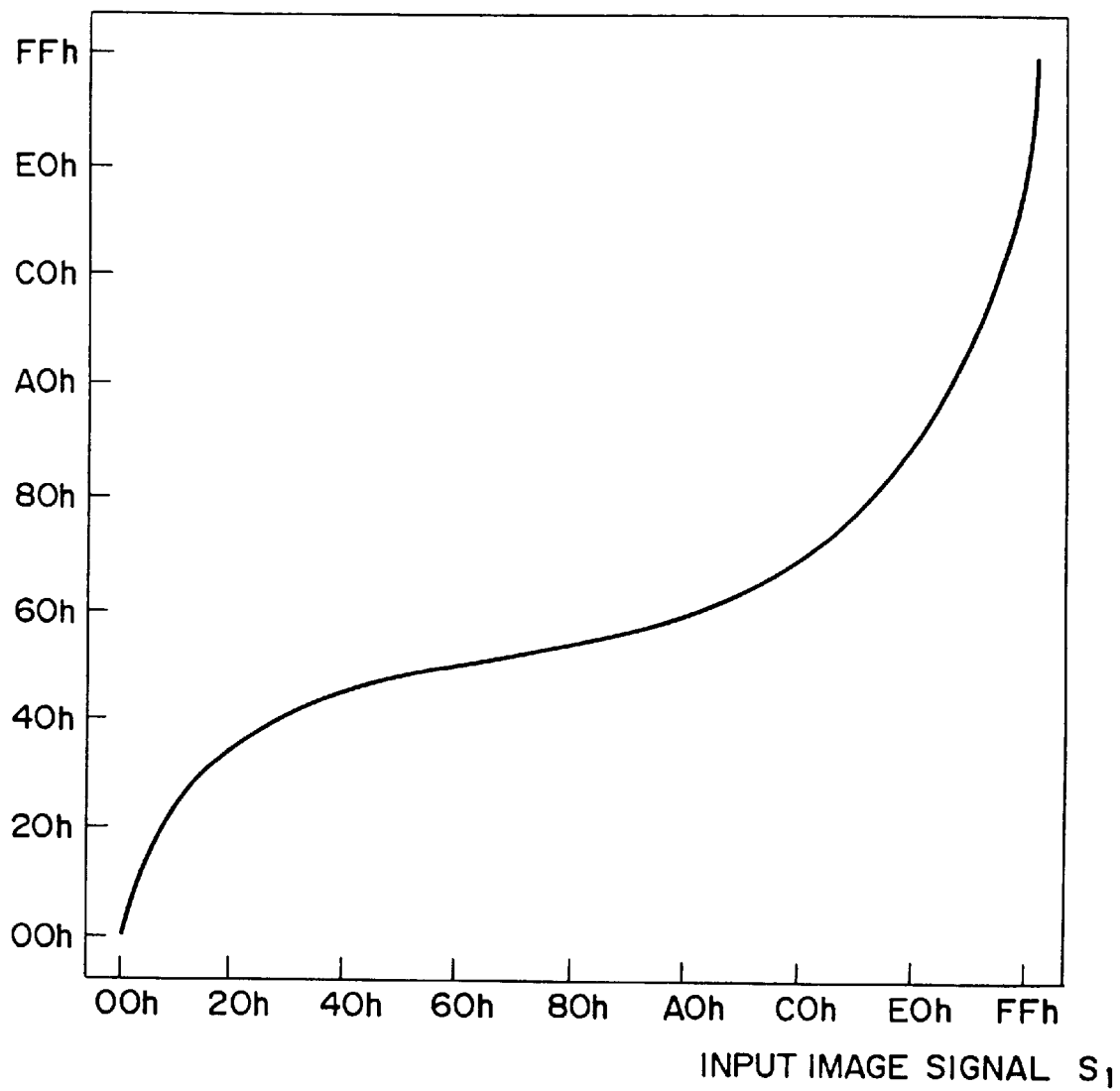
FIG. 3 is a graph showing the look-up table formed by the method of FIG. 2.

The LUT 13 has a property curve as shown in FIG. 3, and is formed in the manner described in connection with FIG. 2 as a conventional case. As mentioned above, the look-up table (LUT) 13 serves to convert the image signal, i.e., a value of the input image signal S1 from the image reading means 2 into a value of the output image signal S2 which is to be output to the image writing-in means 6.

Next, the correction of the LUT 13 will be explained. The image data are output by the image signal generating device 5 connected to the image processing means 3 of the image forming system at seventeen steps per 10h (hexadecimal number) from 00h to FFh. The image data are sent to the image writing means 6 and the image forming means 7 via the LUT 13 and are output on the recording sheet P as the image pattern through a predetermined developing process. Thus, on the recording sheet P, a stripe-pattern the density D1 of which is gradually increased from the white portion to the black portion is output as the image pattern.

Then, the recording sheet on which the image pattern is formed is placed on the reading position (original glass support), and the density of the image pattern is read by the image reading means 2. In this case, if the output property of the image forming means 7 is not changed from the property when the LUT 13 is formed, the input image signal S1 input to the image processing means 3 from the image reading means 2 is to be the same as the output image signal S2 output from the image processing means 3 to the image forming means 7, as shown by a straight line (d) in FIG. 4.

Figure 4:
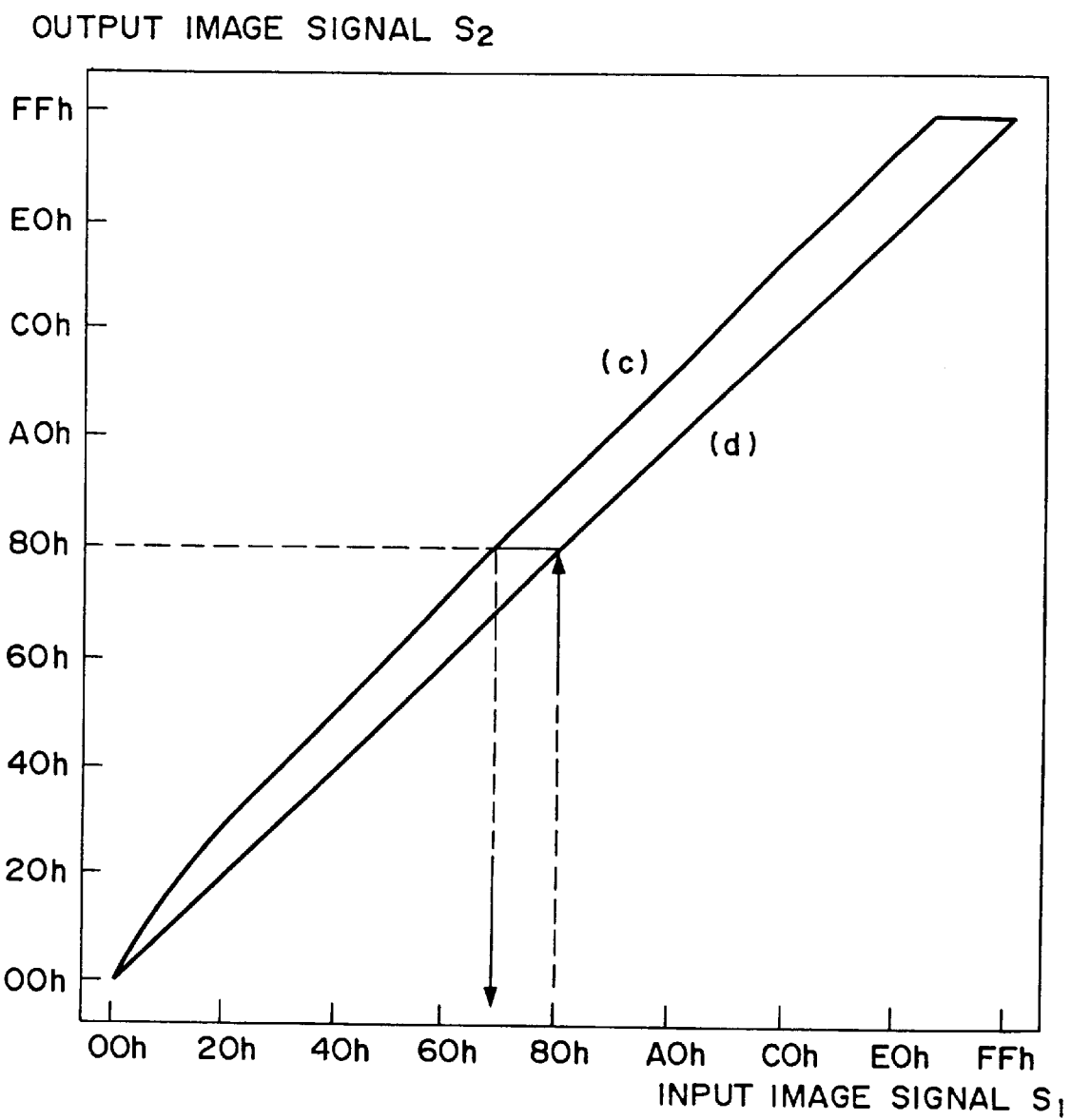
FIG. 4 is a graph showing a method of forming an auxiliary table.

However, as shown by a curve (c) in FIG. 4, if the input image signal S1 differs from the output image signal S2, the auxiliary table 15 is formed in the same manner as the formation of the normal LUT 13 to correct the difference, thereby correcting the data in the LUT 13 to correspond to the property of the image forming means 7 at this point.

Accordingly, by converting the input image signal S1 into the output image signal S2 through the auxiliary table 15 and the LUT 13, it is possible to always provide the proper image density D1 of the entire image, regardless of the deterioration of the property of the image forming means 7.

Incidentally, it should be noted that, when it is desired to emphasize the specific density, the LUT 13 which is firstly set should not correct the relation between the output image signal S2 and the output image density D1 linearly, but may correct it non-linearly.

Figure 5:
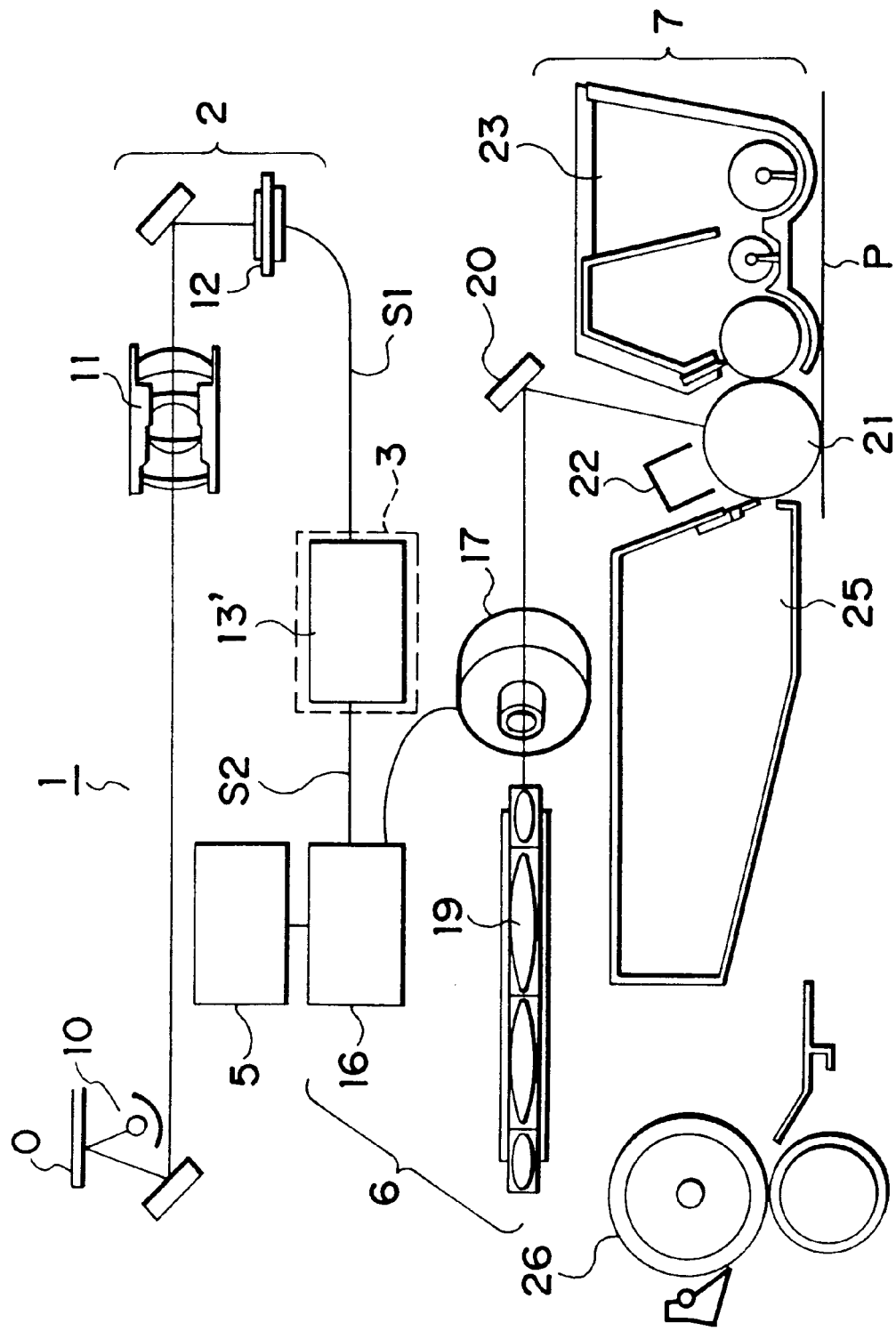
FIG. 5 is a schematic elevational sectional view of an image forming apparatus according to another embodiment of the present invention.

FIG. 5 shows another embodiment of the present invention. In this embodiment, the formation of the look-up table is effected by the image forming apparatus itself so that the LUT 13 and the auxiliary table 15 as in the previous embodiment are unified in one unit. Since the construction and function of the image forming apparatus according to this embodiment are similar to those of the previous embodiment, only the difference will be described.

In this embodiment, the auxiliary table 15 as in the previous embodiment is not provided, and thus, the input image signal S1 is directly input to a look-up table (LUT) 13' without passing through any auxiliary table. Further, the image signal generating device 5 is not connected to the LUT 13' but to the laser driver circuit 16 of the image writing means 6 so that the image signal from the image signal generating device 5 is directly input to the laser driver circuit 16 without passing through the LUT 13'.

Figure 6:
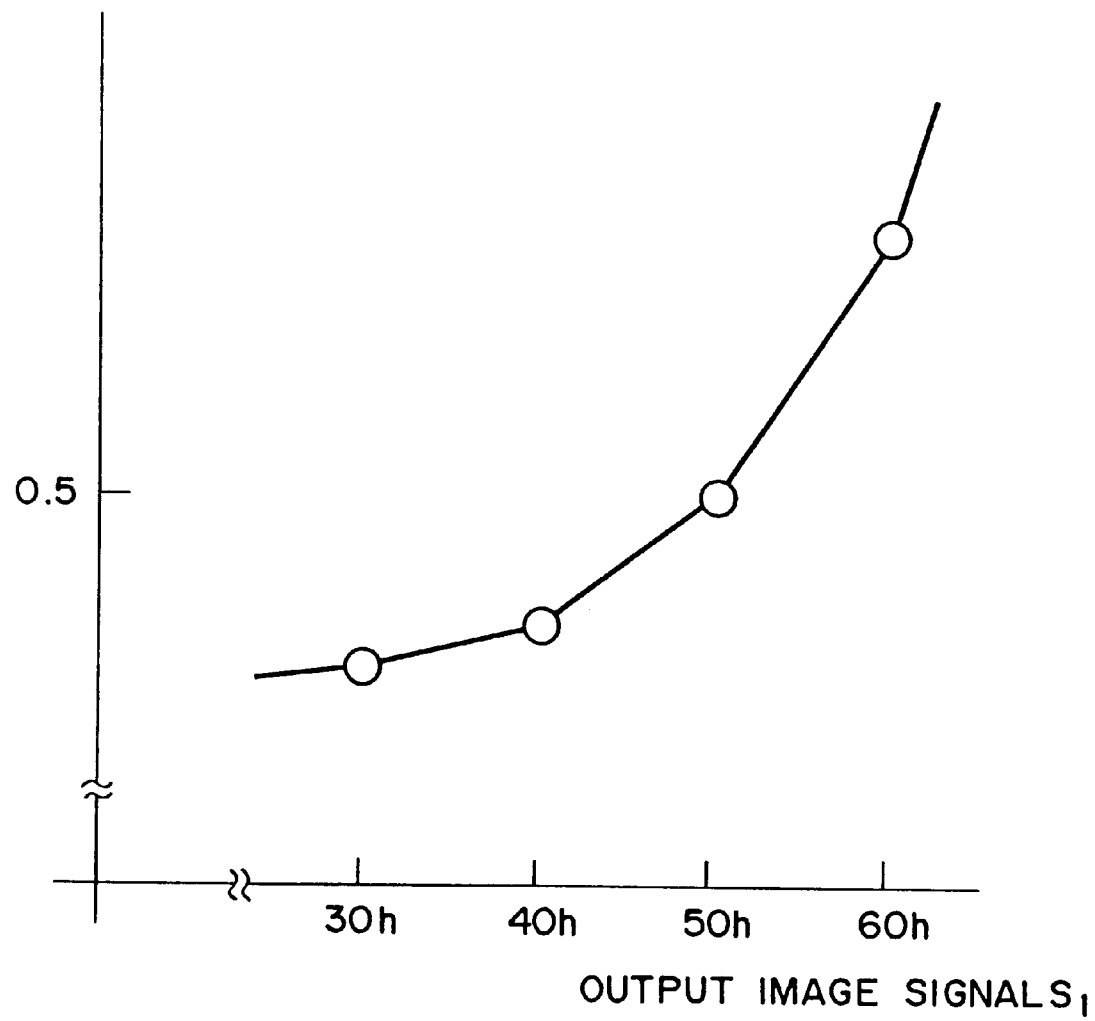
FIG. 6 is a graph showing a linear interpolation.

Next, the operation of the image forming apparatus according to this embodiment will be explained. As in the previous embodiment, the check pattern the image density of which is gradually and steppingly varied is output. In this case, as mentioned above, the check pattern does not pass through the LUT 13'. By reading the image pattern corresponding to the check pattern by the image reading means 2, the output property of the image forming means 7 at this point can be judged. Thereafter, the LUT 13' is formed in the same manner as the formation of the normal LUT. In the formation of the LUT 13', since there are seventeen image data, the data between these image data are determined by the linear interpolation (FIG. 6). While, in the previous embodiment, the LUT 13 as the reference was firstly formed and the correction was effected by adjusting the data of the reference LUT 13 by the auxiliary table 15, in this embodiment, since there is no reference LUT 13 but, a new LUT 13' is formed by the image forming apparatus each time. The corrections other than the linear correction are difficult to be relatively; however, in this embodiment, since the correction can easily and automatically be effected, it is excellent for practical use.

In the aforementioned two embodiments, after the image pattern as shown in FIG. 7 is output, the image pattern is read. According to this, if the recording sheet P is fed in a direction B (FIG. 7) to the image forming means, although the dispersion in the density can be averaged regarding a direction A (widthwise direction of the recording sheet P) perpendicular to the direction B, the unevenness of the density in the direction B is apt to influence the output image pattern. That is, since the each step of density (for example, 70h) is formed substantially along a straight line, the difference in density in the longitudinal direction can be detected, but it is difficult to detect the difference in density in the widthwise direction. Namely, the output property can merely be linearly detected.

Figure 8:
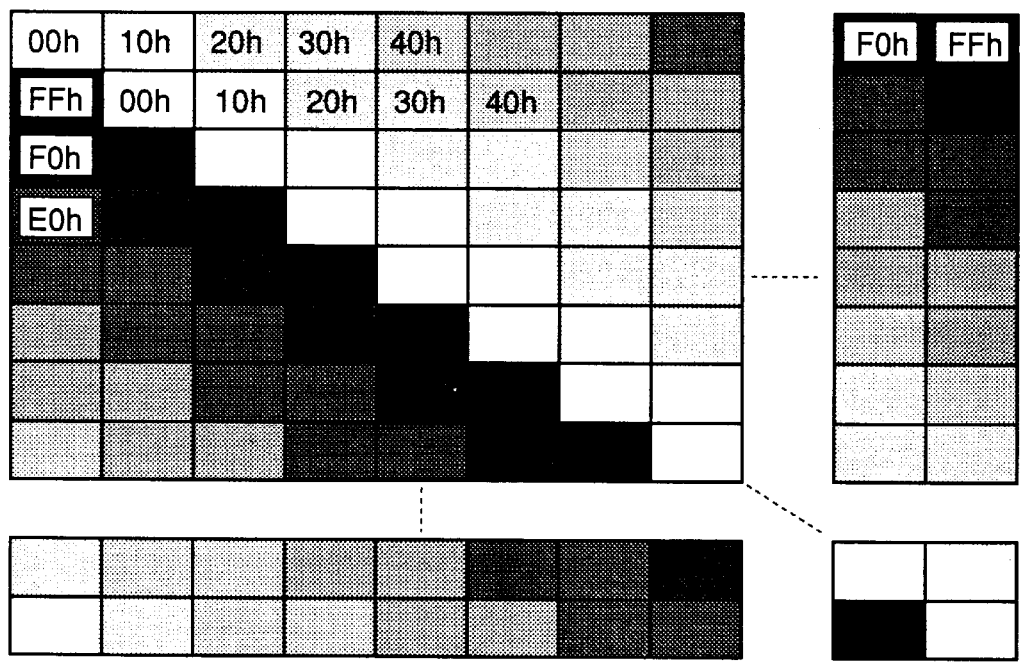
FIG. 8 is a view showing an image pattern output by another check pattern.

Thus, by using a two-dimensional image pattern the image density of which is varied in both longitudinal and widthwise directions as shown in FIG. 8, it is possible to perform the correction more properly as a whole. Further, when the image pattern as shown in FIG. 8 is used, since the difference in the output image density D1 regarding the same image data can be detected, it is possible to detect an abnormality in the image forming apparatus. More particularly, if the dispersion or difference in the density regarding the same pattern is greater than 10h, it is assumed that the abnormality in the image forming apparatus occurs; by such diagnostic routine, it is possible to check the image forming apparatus.

Next, an image forming apparatus having a light amount table will be described.

Figure 9:
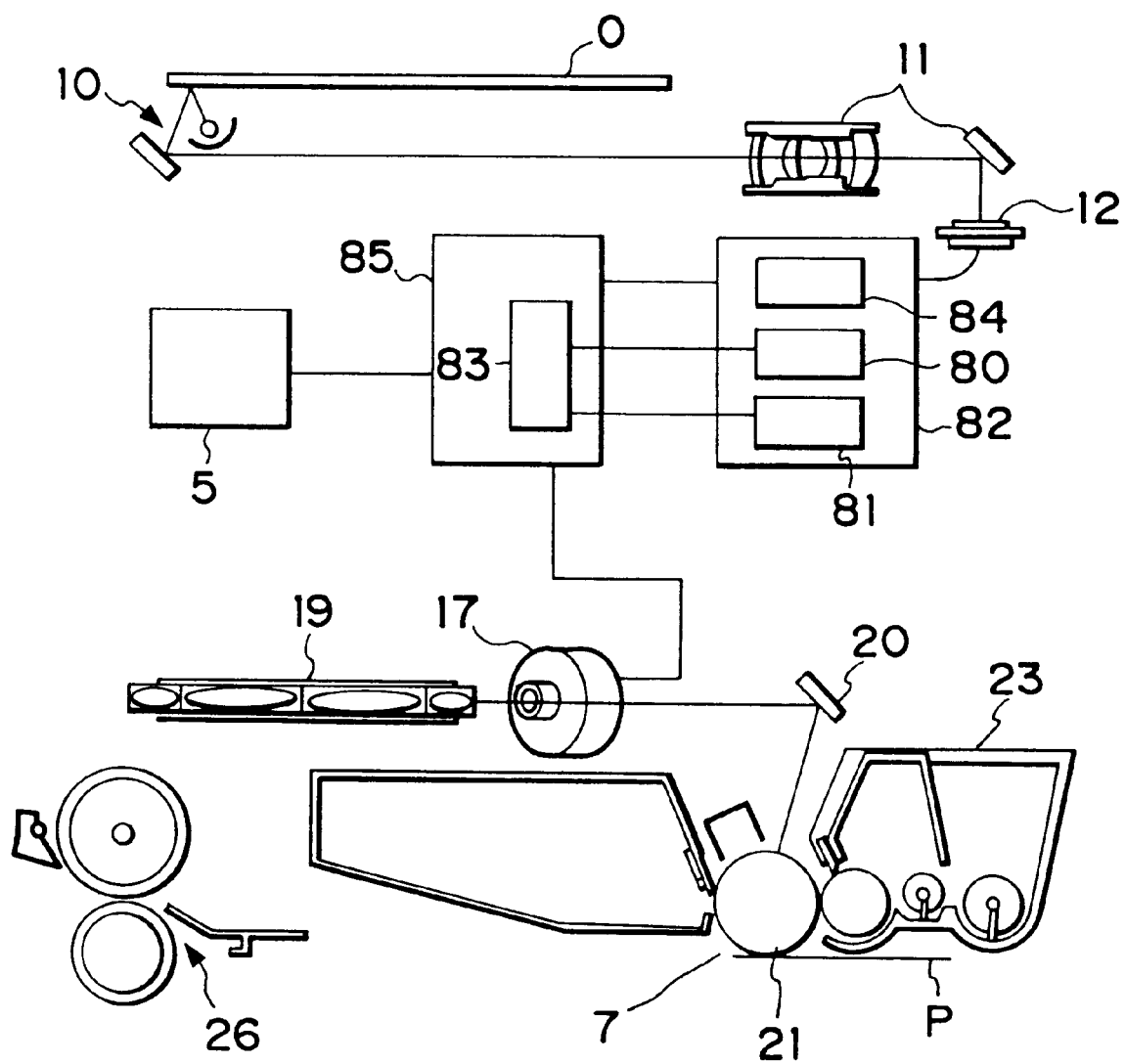
FIG. 9 is a schematic elevational sectional view of an image forming apparatus according to a further embodiment of the present invention.

FIG. 9 shows a further embodiment of the present invention. In FIG. 9, a reference numeral 10 denotes a lighting device 10 for lighting an original placed on an original glass support 0; 11 denotes an optical system for projecting an original image; 12 denotes a CCD (reading means) for cooperating with the optical system to convert the original image into an electric signal of eight-bits with a resolving power of 400 dpi; 84 denotes an image processing device for processing an image signal; and 85 denotes a laser driver circuit for driving a semi-conductor laser unit (laser light source) 17 in response to the image signal. The image processing device 84 is incorporated into a CPU 82, together with a memory 80 storing a light amount table corresponding to the image density, and a calculating means 81. The laser driver circuit 85 incorporates therein an auto power controller (referred to as "APC" hereinafter) 83 acting as a control means for monitoring the light amount of the laser and for correcting the light amount of the semi-conductor laser unit 17 on the basis of the comparison result from the calculating means 81.

A laser beam emitted from the semi-conductor laser unit 17 is deflected by a rotating polygonal reflection mirror 19 and then is sent to a photosensitive drum 21 via a mirror 20. The reference numeral 7 denotes an electrophotographic image forming portion; 23 denotes a developing device; 26 denotes a fixing device; and 5 denotes an image signal generating device (generating means) for generating any image signal (reference signal) at any pattern.

Figure 10A:
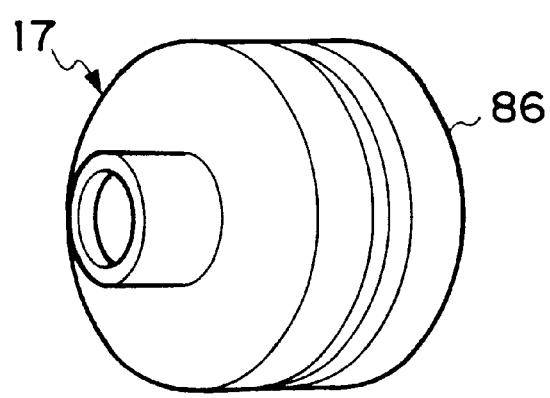
FIGS. 10A to 10D are views for describing a semi-conductor laser used with the embodiment of FIG. 9.
Figure 10B:
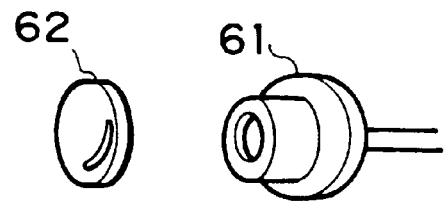
Figure 10C:
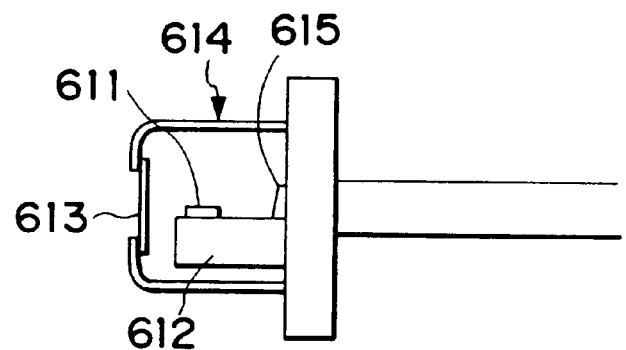
Figure 10D:
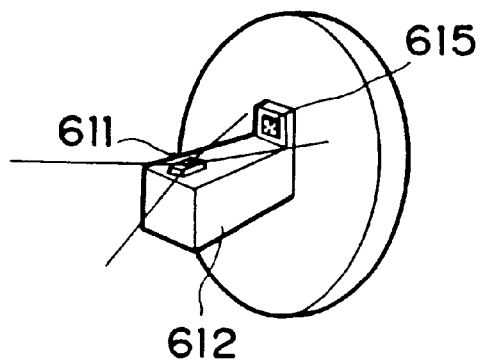

FIGS. 10A to 10D are views for the semi-conductor laser unit 17. FIG. 10A is a plan view of the laser unit. The semi-conductor laser unit 17 comprises a semi-conductor laser element 61 and a collimator lens 62 (FIG. 10B) which are housed in a lens-barrel 86 (FIG. 10A). As shown in FIG. 10C, the semi-conductor laser element 61 includes a semi-conductor laser chip 611 mounted on a stay 612 made of copper. The laser beams are emitted forwardly and rearwardly as shown in FIG. 10D. The forward laser beam is emitted from a case 614 through a window 613, and the rearward laser beam is illuminated on a laser light intensity monitoring pin photodiode (referred to as "PD" hereinafter) 615. Incidentally, the wave length of the semi-conductor laser is 780 nm.

Figure 11:
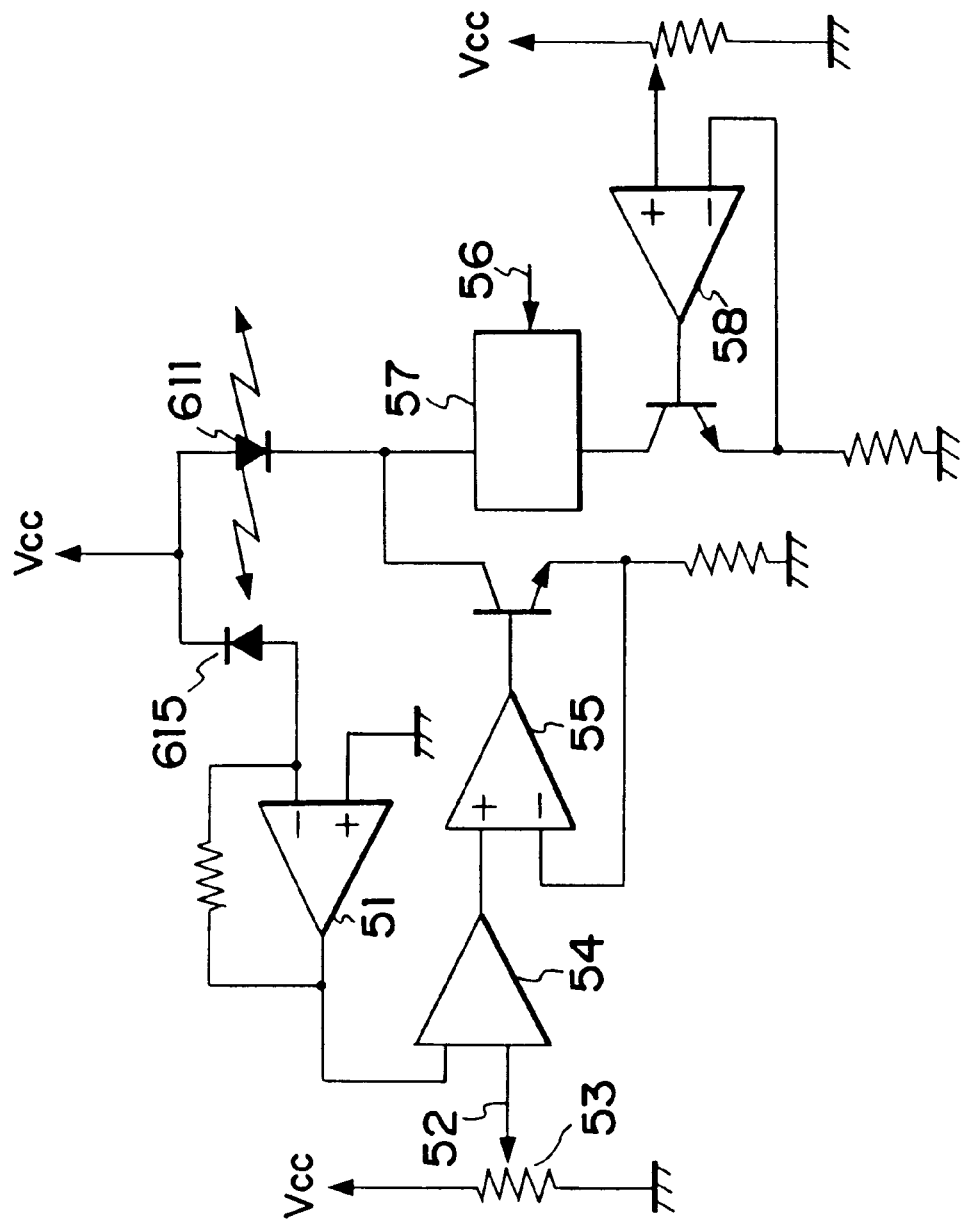
FIG. 11 is a circuit diagram of a laser driver circuit of the embodiment of FIG. 9.

FIG. 11 is a circuit diagram of the semi-conductor laser driver circuit 85. The APC 83 operates as follows. The above-mentioned semi-conductor laser chip 611 and DP 615 are depicted in the circuit. When the output is emitted from the DP 615, a current proportional to the laser light amount is input to a current/voltage converter 51. The reference numeral 52 denotes a target value for the light amount of the emitted laser, which is set by a an adjustable resistor 53. The actual light amount is compared with the target value by a comparator 54, and an output from the comparator 54 controls a constant current circuit 55. The constant current circuit 55 acts as a bias current source for the semi-conductor laser. The reference numeral 56 denotes a data signal for turning the laser ON/OFF; and 57 denotes a high speed switching element of GaAs system for controlling the current in response to the data signal (voltage signal). A constant current circuit 58 provides a drive current for turning the semi-conductor laser ON/OFF.

Next, the operation of the image forming apparatus of FIG. 9 will be described with reference to a flow chart shown in FIG. 12. When any check reference signal (for example, check reference signal regarding a halftone image) is emitted from the image signal generating device 5, the semiconductor laser unit 17 emits the laser light to form an image on the photosensitive drum 21 (step S1). In this case, the light amount of the laser is monitored by the APC 83.

The formed image is transferred onto a recording sheet P. This recording sheet is then placed on the original glass support 0, and the image on the recording sheet is read by the lighting device 10 and the optical system 11 photoelectrically (step S2). The read image is converted into the image signal by the conversion means, and the density data of the image is compared with the light amount table in the memory 80 (FIG. 13A) by the calculating means 81 (step S3). If the read image data is within a control range, the APC 83 corrects the laser light amount (upon the emission of the check signal) on the basis of the comparison result from the calculating means 81.

Figure 13A:
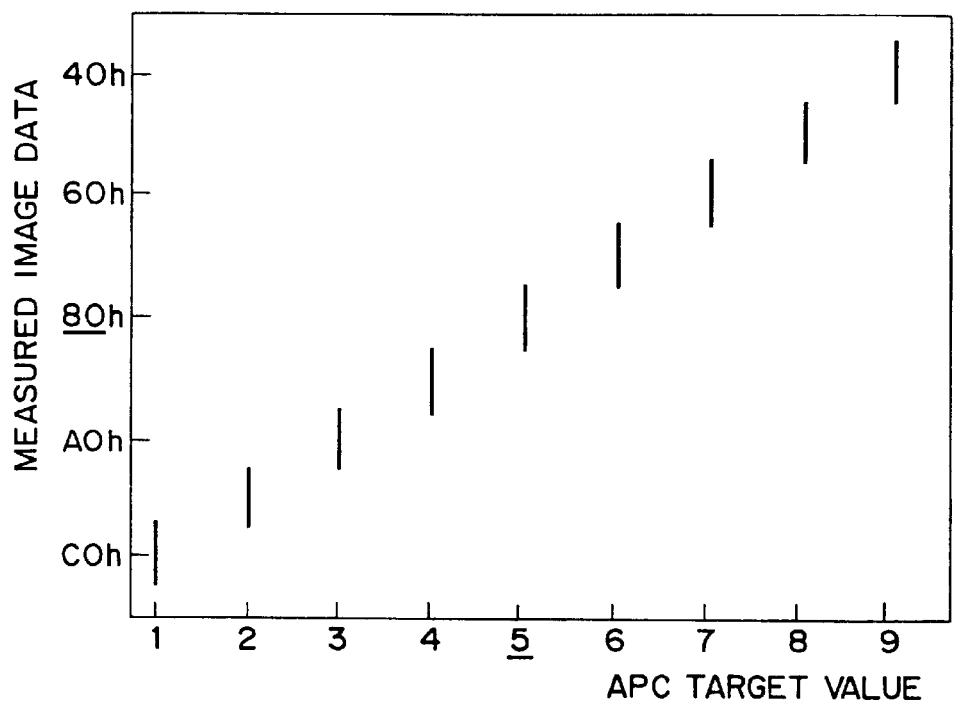
FIG. 13A is a graph showing a table for determining an APC target value, used with the image forming apparatus according to the embodiment of FIG. 9.

Next, a method of judging whether the read image data is within the control range or not will be described hereinbelow. In FIG. 13A, the measured image data is of eight-bits from 0 to 255 (0 is all white, 255 is all black, and the in-between steps are grey step).

Now, for facilitating the understanding of the invention, the data has normally a HEX (hexadecimal) form. As shown in the flow chart (FIG. 12), since the output image is output as the data of 80h (just mid-density), if the image forming apparatus is normal, the read value should be 80h (underlined) (it has been so set initially). The target value of the APC 83 is initially set at 5. In this condition, the laser 17 can be powered up by 4 steps at the maximum. In other words, the reserve power of the APC target value is +4. The graph of FIG. 13A indicates that, if the density of the image is decreased due to the deterioration of the image forming apparatus or the like, the control can be effected by the read value of 40h. In this way, since the upper limit of the control depends upon the upper limit of the laser power, the upper limit of the control can be determined in dependence upon the APC target value when the image is read, as follows:

80h−(9−present target value)×10h=upper limit of control range

Figure 12:
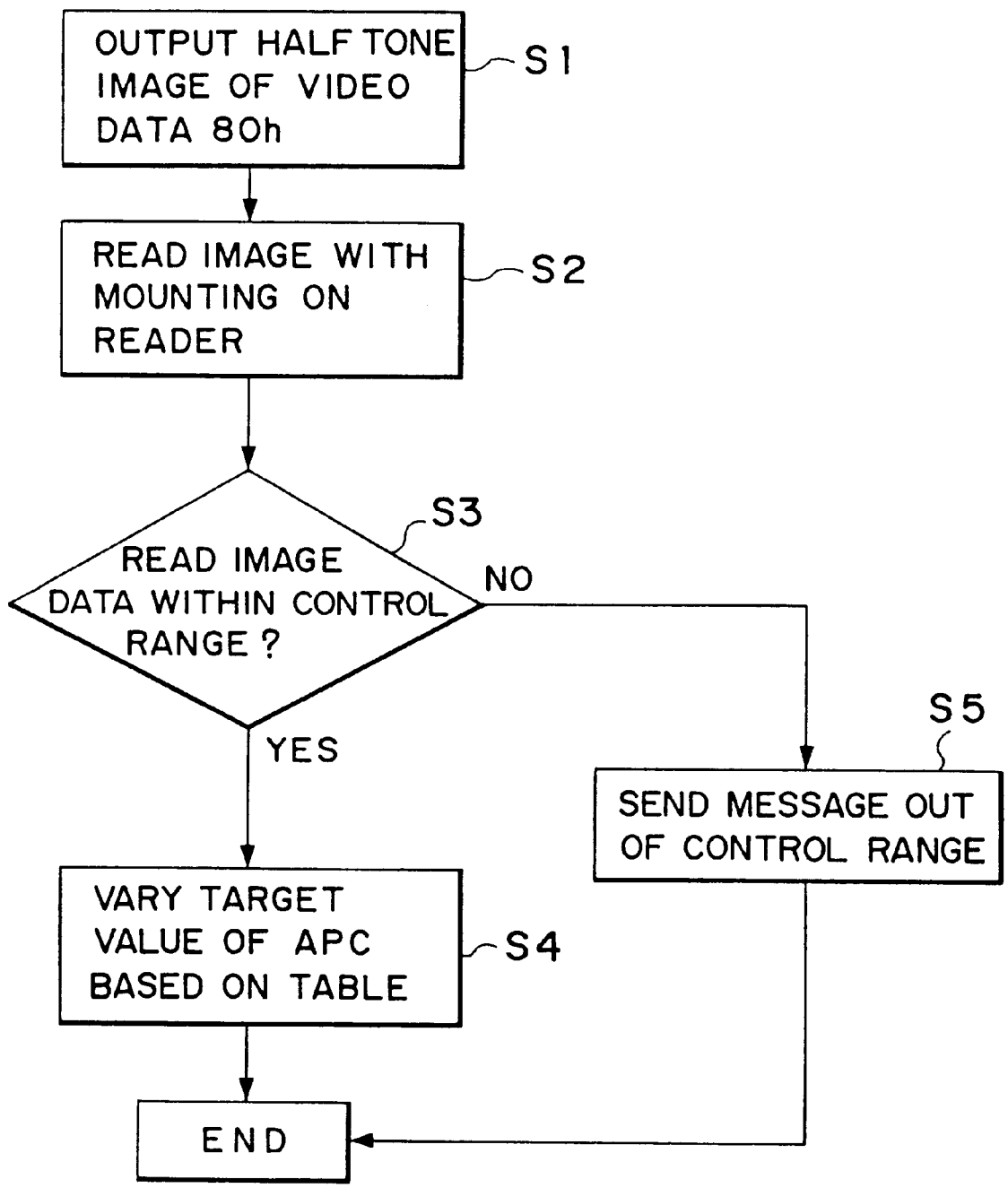
FIG. 12 is a flow chart showing the operation of the image forming apparatus according to the embodiment of FIG. 9.

Since, if the APC target value exceeds 9, it appears that the semi-conductor laser unit 17 is defective, when the control to be performed is out of this control range, a message for checking the image forming apparatus is emitted (step S5 in FIG. 12).

Figure 13B:
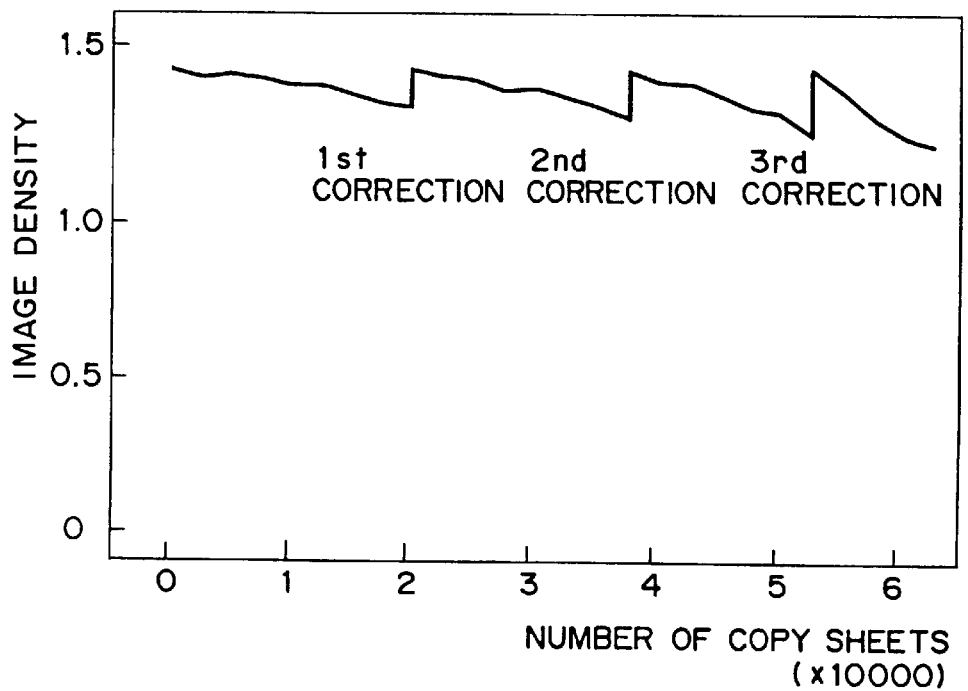
FIG. 13B is a graph showing a light amount correction result according to the embodiment of FIG. 9.

FIG. 13B shows the transition or change in the image density in this embodiment. The endurance test was effected by using a standard 4% original, and the maximum density $D_{max}$ was measured each 1000 copy sheets. In FIG. 13B, the corrections of the image density were effected at 20000, 38000 and 53000 copy sheets, respectively. In any case, the proper image density is restored only by the single feedback.

In this way, even when a deterioration of the apparatus and/or the change in an environmental condition occurs, since the laser light amount is corrected on the basis of the actually output image density on the recording sheet and the light amount table, it is possible to always obtain a stable density gradation. Particularly, in this embodiment, the laser light amount is adjusted not merely by changing the current value, but by changing the target value of the APC means, even when the laser element itself has deteriorated for a long time, it is possible to expose the photosensitive drum with a proper laser light amount, and thus, to form an image having a stable density gradation.

In the illustrated embodiment, the deterioration of the image due to endurance revealed itself as a reduction in the image density for the most part (90% or more). Thus, the APC target values 1 to 4 in the table of FIG. 13A were almost not used. Accordingly, in an embodiment shown in FIG. 14, by setting the initial target value of the APC 83 to 3, it is possible to widen the range of the correction for the reduction in density.

In the embodiments shown in FIG. 13A and FIG. 14, it was found that the feedback sometimes became unstable in the vicinity of the density regarding the switching of the APC target value. To avoid this, in an embodiment shown in FIG. 15, the hysteresis is provided in the APC target value changing table (FIG. 15).

When the measured image data becomes smaller (changes upwardly in the graph), the APC target value is changed along an upper broken line (①); whereas, when the measured image data becomes greater, the APC target value is changed along a lower broken line (②). By this hysteresis control, it is possible to obtain a stable feedback even in the vicinity of the density regarding the switching of the APC target value.

Figure 15:
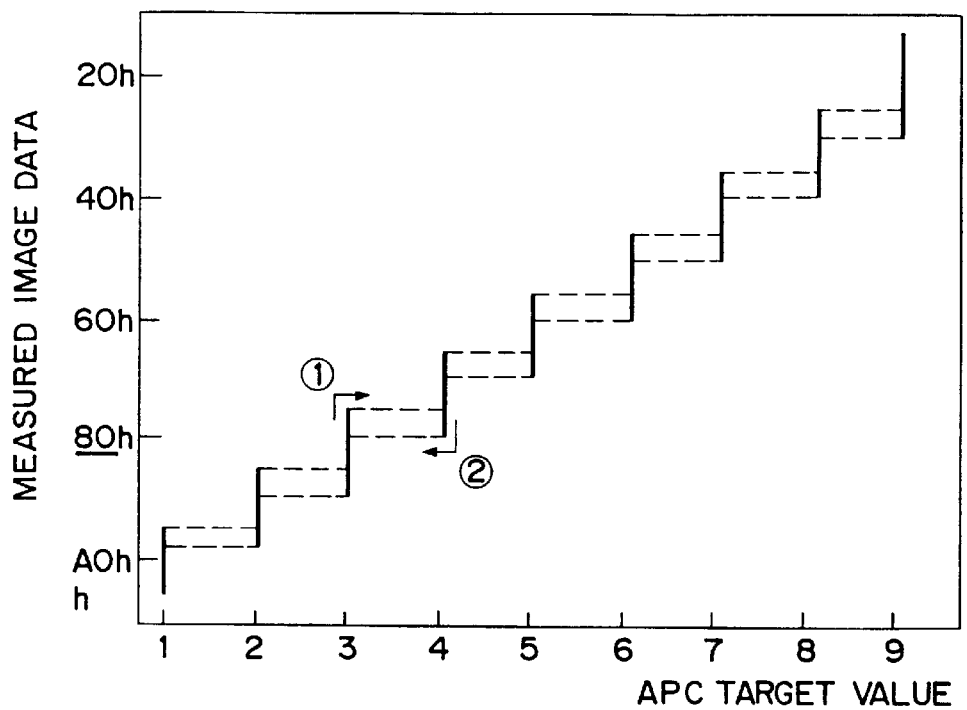
FIG. 15 is a graph showing a light amount table used with a further embodiment of the present invention.
Figure 17A:
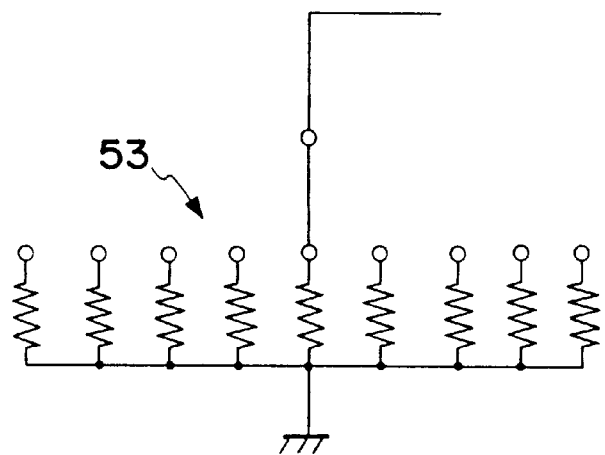
FIG. 17A is a view showing the details of the variable resistor 53 of FIG. 11.

In the above-mentioned embodiments shown in FIG. 13A, FIG. 14 and FIG. 15, the APC value was previously set to have a predetermined resistance value, as shown in FIG. 17A (showing the details of the variable resistor 53 of FIG. 11), for the reason that the excessive current is prevented from flowing in the semi-conductor laser unit 17. Thus, the APC target values were desultory values.

Figure 16:
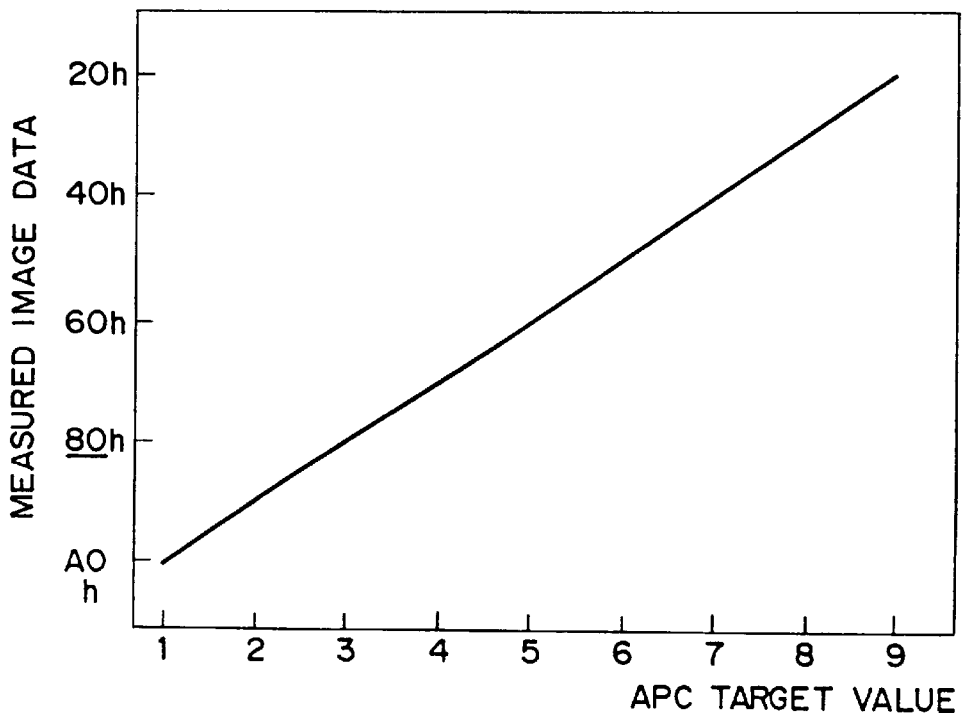
FIG. 16 is a graph showing a light amount table used with a still further embodiment of the present invention.
Figure 17B:
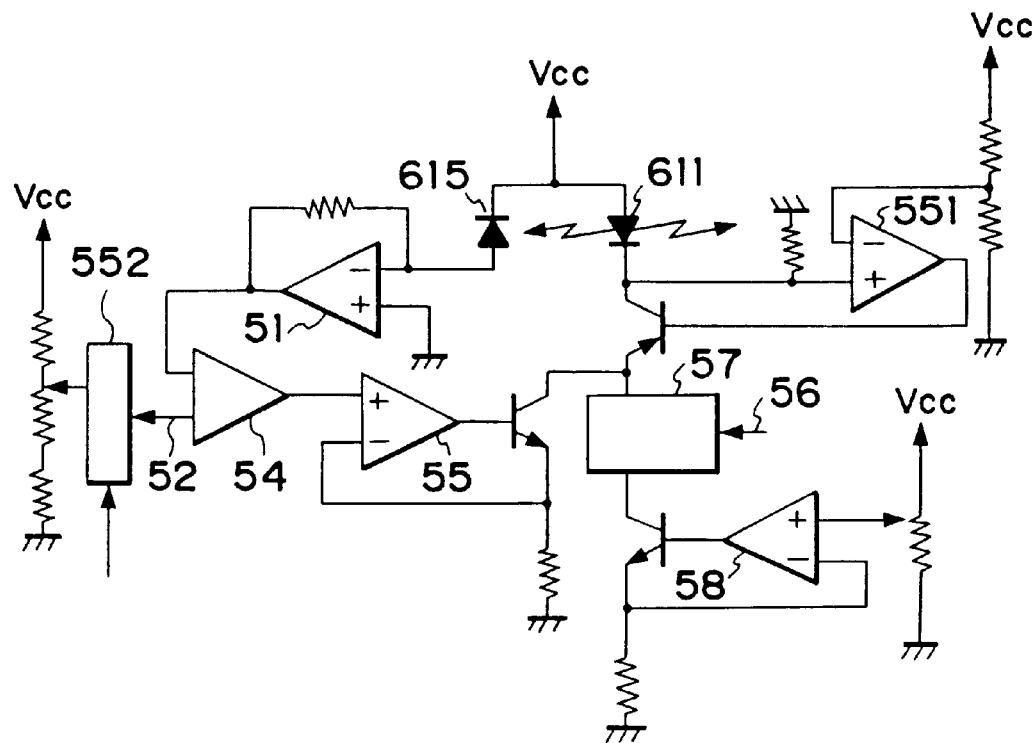
FIG. 17B is a view showing a laser driver circuit.

In an embodiment shown in FIG. 17B, a limiter circuit 551 is added to the APC circuit. Since excessive current is prevented from flowing in the semi-conductor laser unit 17 by the limiter circuit 551, the setting values of the APC 83 can be continuously changed by a soft volume 552. A table used in this embodiment is shown in FIG. 16. Since the APC target value can be changed continuously, the control can be effected more smoothly. Incidentally, the laser light source is not limited to the semi-conductor laser, but may be a gas laser, a pigment laser or the like.

While the present invention was explained in connection with specific embodiments, it is not limited to these embodiments, but various alterations can be effected within the scope of the present invention.

What is claimed is:

1. An image forming apparatus, comprising:

a laser beam generating source for emitting a laser beam of a same amount from a front and rear thereof;

light amount detecting means for detecting an amount of a rear beam emitted from said laser beam generating source;

automatic power control means for controlling power to said laser beam generating source so that a detected light amount of said light amount detecting means is maintained at a target light amount;

image forming means for forming an image on a recording material by emitting the laser beam from said laser beam generating source corresponding to an image signal; and reading means for reading an original; and target light amount change means for changing the target light amount corresponding to a read-in signal obtained by reading an original on which a test pattern is formed by said reading means.

* * * * *

UNITED STATES PATENT AND TRADEMARK OFFICE
CERTIFICATE OF CORRECTION

PATENT NO. : 6,133,934  
DATED : October 17, 2000  
INVENTOR(S) : Masao Nakano

Page 1 of 1

It is certified that error appears in the above-identified patent and that said Letters Patent is hereby corrected as shown below:

Title page,
Insert: [*] Notice: This patent issued on a continued prosecution application filed under 37 C.F.R. § 1.53(d), and is subject to the twenty year patent term provisions of 35 U.S.C. § 154(a) (2). --.

Column 1,
Line 45, "apparent is" should read -- is apparent --.

Column 2,
Line 9, "are" should read -- is --.

Column 5,
Line 56, "the" should be deleted.

Column 6,
Line 35, "for" should read -- for describing --.

Column 7,
Line 22, "grey step)." should read -- grey). --.

Signed and Sealed this

Eighteenth Day of December, 2001

Attest:

JAMES E. ROGAN
*Attesting Officer*  *Director of the United States Patent and Trademark Office*